United States Patent [19]

Frei et al.

[11] Patent Number: 4,780,719
[45] Date of Patent: Oct. 25, 1988

[54] METHOD OF, AND APPARATUS FOR, AREA AND AIR SPACE SURVEILLANCE

[75] Inventors: Ernst Frei, Kloten; Hansjörg Schlaepfer, Winkel, both of Switzerland

[73] Assignee: Contraves AG, Zürich, Switzerland

[21] Appl. No.: 861,420

[22] Filed: May 9, 1986

[30] Foreign Application Priority Data

May 23, 1985 [CH] Switzerland .......................... 2194/85

[51] Int. Cl.⁴ .............................................. G01S 13/86
[52] U.S. Cl. ........................................ 342/53; 342/67; 342/351
[58] Field of Search ................................. 342/52–56, 342/58, 61, 67, 351; 356/5, 51; 244/3.15, 3.16, 3.17, 3.19

[56] References Cited

U.S. PATENT DOCUMENTS

| | | | |
|---|---|---|---|
| 3,010,102 | 11/1961 | Ketchledge et al. | 342/53 |
| 3,076,961 | 2/1963 | Bibbero | 342/53 |
| 3,108,270 | 10/1963 | Fairbanks | 342/53 |
| 3,261,014 | 7/1966 | Diaz | 342/53 |
| 3,501,762 | 3/1970 | Klees | 342/53 |
| 3,599,207 | 8/1971 | Foiani et al. | 342/52 |
| 3,644,043 | 2/1972 | Jones et al. | 356/5 |
| 3,787,857 | 1/1974 | Lazarchik et al. | 342/351 |
| 3,897,150 | 7/1975 | Bridges et al. | 356/5 |
| 3,921,169 | 11/1975 | Lazarchik et al. | 342/351 X |
| 3,981,010 | 9/1976 | Michelsen | 342/55 |
| 4,015,258 | 3/1977 | Smith et al. | 356/5 X |
| 4,050,068 | 9/1977 | Berg et al. | 342/53 |
| 4,122,521 | 10/1978 | Rick et al. | 342/52 X |
| 4,160,251 | 7/1979 | Lazarchik et al. | 342/351 |
| 4,264,907 | 4/1981 | Durand, Jr. et al. | 342/53 |
| 4,317,117 | 2/1982 | Chasek | 342/53 |
| 4,319,332 | 3/1982 | Mehnert | 356/5 X |
| 4,511,897 | 4/1985 | Lindner | 342/52 |
| 4,521,861 | 6/1985 | Logan et al. | 342/351 X |

FOREIGN PATENT DOCUMENTS

| | | |
|---|---|---|
| 0135065 | 3/1985 | European Pat. Off. |
| 3113472 | 10/1982 | Fed. Rep. of Germany |
| 0079478 | 5/1982 | Japan ................ 342/52 |

OTHER PUBLICATIONS

Koppl, "H930 Weapon Fire Control System Radar Sensors"; *Proc.s of NAECON* '81, pp. 623–629.

*Primary Examiner*—Theodore M. Blum
*Assistant Examiner*—Bernarr E. Gregory
*Attorney, Agent, or Firm*—Werner W. Kleeman

[57] ABSTRACT

The proposed surveillance system for surveilling a given scenario in azimuth and in elevation comprises an infrared surveillance detection device passively operating in the infrared region and a radar search and/or tracking device operating in the active mode for range determination. The targets or target information data are obtained as video signals from the infrared surveillance detection device during each search cycle and are processed in an infrared data processor. The video signals are discriminated and stored in an infrared signal processor with respect to their elevation angle values ($\lambda$) and azimuth angle values ($\alpha$). The values of the azimuth angle ($\alpha$) are simultaneously fed to a radar activation and contol unit for triggering a momentary or short-time emission by the radar search and/or tracking device. Genuine target coordinates with respect to elevation, azimuth and range as determined by the infrared surveillance detection device and the radar search and/or tracking device are fed to a superordinate fire control system while false alarms or false-target related data are suppressed in order to prevent further radar emission in the direction of such target objects.

22 Claims, 1 Drawing Sheet

METHOD OF, AND APPARATUS FOR, AREA AND AIR SPACE SURVEILLANCE

BACKGROUND OF THE INVENTION

The present invention broadly relates to a new and improved method of, and apparatus for, area and air space surveillance.

In its more particular aspects, the present invention specifically relates to a new and improved method of, and apparatus for, area and air space surveillance using an infrared surveillance detection means or device passively operating in the infrared region for covering a given scenario with respect to azimuth and elevation, and an actively operating radar search and/or tracking means or device for target recognition and range-finding.

A system for ranging and tracking flying objects is known, for example, from German Pat. No. 2,240,598. This system is constructed for target ranging of flying objects which are already in direct approach, and comprises radar apparatus for coarse detection and laser apparatus for range-finding as well as an infrared target tracking apparatus for detecting the distance difference of the flying object.

SUMMARY OF THE INVENTION

Therefore, with the foregoing in mind, it is a primary object of the present invention to provide a new and improved method of, and apparatus for, area and air space surveillance and which does not exhibit the drawbacks and shortcomings of the prior art constructions heretofore discussed.

Another and more specific object of the present invention aims at providing a new and improved method of, and apparatus for, area and air space surveillance and which, as compared to known surveillance systems, precludes to a large extent the reconnaissance, i.e. detection and an attack on the surveillance system while retaining optimum surveillance.

Yet a further significant object of the present invention aims at providing a new and improved construction of an apparatus for area and air space surveillance and which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the method of the present development is manifested by the features that, from infrared-detected target information data obtained during each search or scan cycle of the infrared surveillance detection means or device, potential target information data are filtered out conjointly with their elevation and azimuth angle values. By momentary or short-time emission from the radar search and/or tracking means or device, the potential targets are either verified as genuine or true targets or stored as false targets using radar-detected target information data provided by radar sensors.

As alluded to above, the present invention is not only concerned with the aforementioned method aspects, but also relates to a novel construction of an apparatus for carrying out the same. Generally speaking, the inventive apparatus comprises a surveillance detecting means or device covering a given scenario with respect to azimuth and elevation and passively operating in the infrared region. Such apparatus further comprises an actively operating radar search and/or tracking means or device.

To achieve the aforementioned measures, the inventive apparatus, in its more specific aspects, comprises:

an infrared signal processor associated with the infrared surveillance detection means and operating according to predetermined methods of evaluating, transferring and storing incoming infrared-detected target information data;

said infrared signal processor filtering out potential target information data and feeding such data to the series connected radar search and/or tracking means or device for momentary or short-time activation of the radar search and/or tracking means or device, and a fire control system associated with the entire surveillance system and which can be oriented to the target using the essential target coordinates, namely elevation, azimuth and range.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
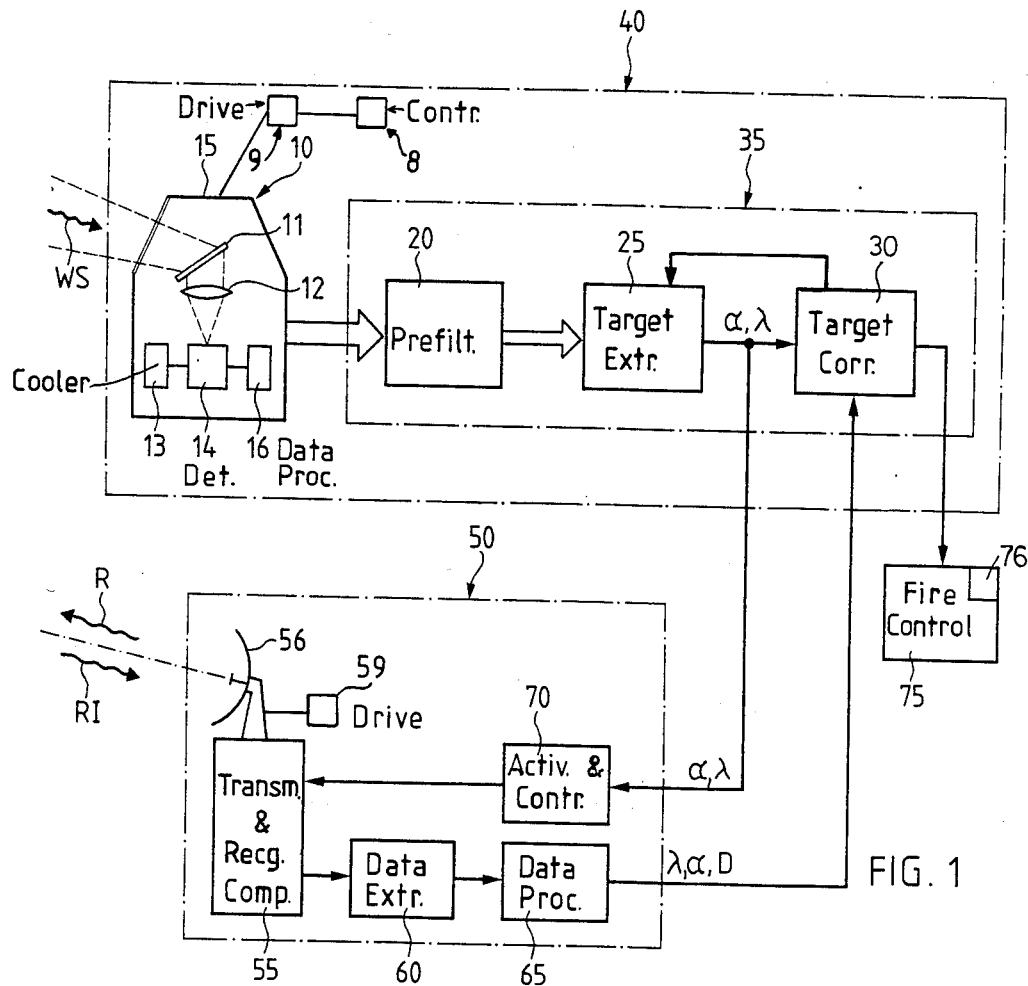
FIG. 1 shows a schematic block circuit diagram of an exemplary embodiment of the inventive area and air space surveillance system.

Describing now the drawings, it is to be understood that to simplify the showing thereof only enough of the structure of the surveillance system has been illustrated therein as is needed to enable one skilled in the art to readily understand the underlying principles and concepts of this invention. Turning now specifically to the block circuit diagram shown in FIG. 1 of the drawings, the surveillance system illustrated therein by way of example and not limitation will be seen to comprise, for area and particularly air space surveillance, an infrared surveillance means or unit generally designated by the reference numeral 40 as well as a radar search and/or tracking means or unit generally designated by the reference numeral 50. The infrared surveillance means or unit 40 substantially comprises an infrared surveillance detection means or device 10 as well as an infrared signal processor 35. The radar search and/or tracking means or unit 50 substantially comprises a radar transmitter/receiver component 55 having an antenna 56, a radar data extractor 60, a radar data processor 65 as well as a radar activation and control unit 70.

The infrared surveillance detection means or device which is generally designated by the reference numeral 10 and which is constructed as an infrared surveillance sensor, contains a housing 15 and therein a mirror 11 which is pivotably supported in a manner not specifically illustrated, an appropriately associated infrared optical system 12, a detector 14 formed by a plurality of detector elements in a linear arrangement, an associated cooling element 13 as well as an electronic infrared data processor 16. As illustrated in greater detail in FIG. 2, this infrared data processor 16 contains a preamplifier component 17, a multiplexer 18 as well as an analog-to-digital or A/D converter unit 19.

The infrared signal processor 35 which is series connected with the infrared surveillance detection means or device 10, contains a prefilter unit 20, a target extractor 25 as well as a target correlator 30.

The mode of operation of the surveillance system constituted by the infrared surveillance means or unit 40 and the radar search and/or tracking means or device 50, will now be described hereinbelow as follows:

Infrared or heat radiation emitted from the scenario or surveyed region or area is received by the infrared surveillance detection means or device 10 which is driven by not particularly illustrated drive means preferably at a constant rotary speed. Due to the rotation of the infrared surveillance detection means or device 10, there are obtained coverage of the scenario with respect to azimuth and, due to the simultaneous pivoting of the mirror 11 in the housing 15, coverage of the scenario with respect to elevation. The thus received infrared or heat radiation indicated by the direction of the arrow WS, arrives at the mirror 11 through a not particularly illustrated infrared transparent entrance window appropriately provided in the housing 15. The infrared or heat radiation is reflected by the mirror 11 and transmitted to an infrared radiation sensitive detector 14 by means of an infrared optical system 12.

Figure 2:
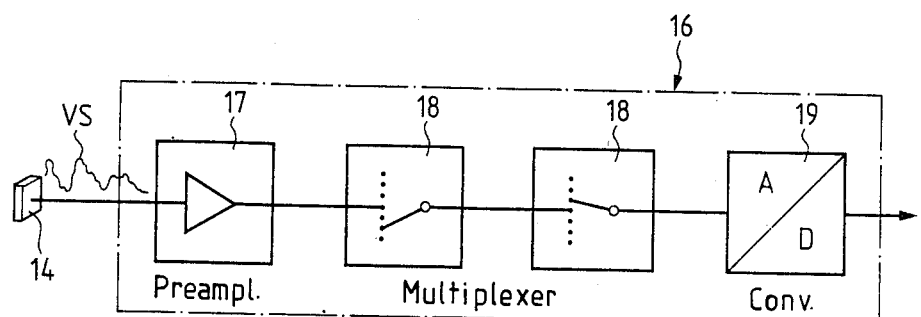
FIG. 2 shows a schematic block circuit diagram of an infrared data processor for use in the surveillance system shown in FIG. 1.

As illustrated in FIG. 2, video signals designated by the reference character VS are supplied by the detector 14 and are fed to the infrared data processor 16 formed by the preamplifier component 17, the multiplexer 18, which preferably is constructed with two stages, and the A/D converted unit 19. The video signals are thereby converted into a serial data flow or stream and are subsequently fed conjointly with the actual azimuth and elevation data from the infrared surveillance detection means or device 10 to the infrared signal processor 35 which is substantially formed by the prefilter unit 20, the target extractor 25 and the target correlator 30.

In the infrared signal processor 35, potential targets or potential target information data from the surveyed area and/or air space are discriminated against background using the total quantity of incoming data arriving from the surveyed or search volume or space. The infrared-detected potential target information data are stored conjointly with their related elevation and azimuth angle values in the target correlator 30. The discrimination preferably is implemented in two stages due to the relatively large amount of incoming data. A first filtering operation on the relatively large amount of incoming video signal data is implemented in the one- or two-dimensional prefilter unit 20 using, for example, a digital or transversal filter and an adaptive follow-up threshold value calculation. The prefilter unit 20 has, for example, a high-pass characteristic so that low frequency signal portions or components originating from relatively large infrared-emitting surfaces are eliminated. The data reduction preferably is implemented using a reduction factor on the order of magnitude of 1000 information data units so that the required detection probability either is not or only insignificantly influenced.

During each search or scan cycle, the infrared-detected target data arriving at the target extractor 25, which is series connected to the prefilter unit 20, and amounting to the order of magnitude of 20k, are examined with respect to their mutual vicinity or cluster formation using various algorithms and correlations and are compared with the content of a stationary or ground or false target memory in order to provide a spatial correlation. Infrared-detected targets which have no genuine target characteristics or which are continually present in the same false target space cell, are eliminated by means of the target extractor 25.

The infrared-detected potential target information data originating from potential targets and filtered out by means of the target extractor 25, are fed to and stored in the target correlator 30 together with the detected values of the elevation angle λ and the detected values of the azimuth angle α. Simultaneously, the values of the azimuth angle α and, if desired, also the values of the elevation angle λ are fed to the radar activation and control unit 70 of the radar detection or search and/or tracking means or device 50.

For verification, the infrared-detected potential target information data identified by the infrared target extractor 25 and fed to the radar activation and control unit 70 as angle data, effect a short-time or millisecond emission of electromagnetic radar pulses in the angular direction of the related targets and such pulses are designated by reference character R. Provided that the radar search and/or tracking means or device 50 identifies a target at the position which has been determined by the infrared surveillance detection means or device 10 and which has been transmitted to the radar search and/or tracking means or device 50, related radar-detected data are received by the radar data extractor 60 and transmitted from there to the radar data processor 65. From the radar data processor 65, radar-detected target information data arranged according to the azimuth angle α as well as range D and possibly also the elevation angle λ, is supplied to the target correlator 30 and compared with the infrared-detected target information data stored therein.

In the presence of a target which is verified by the radar search and/or tracking means of device 50, corresponding genuine target information data including the three essential target coordinates, namely elevation, azimuth and range, is delivered to a superordinate system, preferably the fire control system or device 75 schematically illustrated in FIG. 1. Orienting means 76 are provided and act upon the fire control system or device 75 such as to orient the same to the target verified by the target information data identified as genuine target information data by the inventive surveillance system described hereinbefore. If no correlatable radar-detected target or target information data is present or as long as a terrain-dependent false information about an infrared-detected target is present, the false target related information data is masked and stored in a corresponding space cell of the stationary or ground or false target memory which is activated by means of a suitable reporting-back operation to the infrared target extractor 25. Further target information data originating from the same infrared-detected false target as well as a repeated emission by the radar search and/or tracking means or device 50 in the direction of such target objects are thereby prevented.

During the aforedescribed mode of operation of the surveillance system, the radar search and/or tracking means or device remains passive to a large extent and is exclusively and only momentarily activated when the infrared surveillance detection means or device 10 has identified a potential target. In addition to the range information RI, the azimuth angle α and possibly the elevation angle λ, further essential target information data is detected by the radar search and/or tracking means or device 50, for example, such information as to whether the target constitutes a moving target, a hovering helicopter or a stationary or ground target, and, if desired, the velocity of the moving target.

On the basis of the verified information obtained through the radar search and/or tracking means or device 50, infrared-detected potential targets which do not constitute genuine targets, can be eliminated. This results in a relatively small false alarm probability.

During the aforedescribed mode of operation of the entire surveillance system, drive means 59 rotate the radar search and/or tracking means or device 50 in azimuth preferably slower than the drive means 9 rotate the infrared surveillance detection means or device 10 in azimuth and thus, together with the integrated mirror 11 which is pivotable in elevation, performs essentially a helicoidal search movement for scanning the entire surveillance space under the action of control means 8.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A method of area and air space surveillance, comprising the steps of:
   passively scanning a given scenario with respect to azimuth and elevation by means of passive infrared surveillance detection means operating in the infrared region and thereby detecting the presence of at least one potential target at associated azimuth angle and elevation angle values;
   said passive scanning operation entailing performing scanning cycles;
   during each said scanning cycle, receiving infrared-detected data at associated azimuth and elevation angle values by said passive infrared surveillance detection means;
   filtering out infrared-detected potential target information data at associated azimuth angle and elevation angle values, from said infrared-detected data received by said passive infrared surveillance detection means;
   operatively coupling radar detection means to said passive infrared surveillance detection means and transmitting at least one short radar pulse from said radar detection means at least at said azimuth angle value associated with said infrared-detected potential target information data towards said at least one potential target identified by said infrared-detected potential target information data and by at least said associated azimuth angle value and receiving, by means of radar sensors of said radar detection means, radar-detected target information data associated with at least azimuth angle values;
   correlating said radar-detected target information data associated with at least said azimuth angle values and said infrared-detected potential target information data and associated azimuth and elevation angle values for discriminating between genuine target information data associated with azimuth and elevation angle values and false target information data associated with azimuth and elevation angle values and storing said false target information data and said associated azimuth and elevation angle values.

2. The method as described in claim 1, wherein:
   said step of receiving said infrared-detected data entails receiving video signals constituting said infrared-detected data via a mirror and a detector of the passive infrared surveillance detection means; and
   converting said video signals into a serial data flow by means of an infrared data processor comprising a preamplifier component, an at least single-stage multiplexer and an analog-to-digital converter unit.

3. The method as defined in claim 1, further including the steps of:
   discriminating said infrared-detected data originating from a predetermined surveillance space against background by means of an infrared signal processor series connected with the passive infrared surveillance detection means; and
   storing said infrared-detected potential target information data filtered out from said incoming infrared-detected data conjointly with their associated azimuth and elevation angle values in a target correlator.

4. The method as defined in claim 3, wherein:
   said step of filtering said infrared-detected data entails filtering out from said incoming infrared-detected data, by means of an at least one-dimensional prefilter unit, low-frequency signal components;
   feeding said filtered infrared-detected data to a series connected target extractor in order to thereby obtain said infrared-detected potential target information data and their associated azimuth and elevation angle values; and
   simultaneously feeding at least said azimuth angle values to a radar activation and control unit of said radar detection means.

5. The method as defined in claim 1, further including the steps of:
   feeding radar-detected data received by said radar sensors of said radar detection means, to a radar data extractor;
   thereafter feeding the extracted radar-detected data from said radar data extractor to a radar data processor in order to thereby obtain said radar-detected target information data and at least said associated azimuth angle values; and
   delivering the thus obtained radar-detected target information data and at least said associated azimuth angle values as well as target range values to a target correlator containing said infrared-detected potential target information data and said associated azimuth and elevation angle values detected by said passive infrared surveillance detection means at said associated azimuth and elevation angle values in order to carry out said step of correlating said radar-detected target information data and said infrared-detected potential target information data and to discriminate between said genuine target information data and said false target information data.

6. The method as defined in claim 5, further including the steps of:
   determining elevation angle values associated with said radar-detected target information data; and
   additionally delivering said elevation angle values associated with said radar-detected target information data to said target correlator in order to thereby additionally correlate said radar-detected target information data and said infrared-detected potential target information data with respect to the associated elevated angle values.

7. The method as defined in claim 5, further including the steps of:

masking said false target information data in an infrared target extractor operatively associated with said passive infrared surveillance detection means and preventing recurring false target information data from reaching said target correlator; and storing said masked false target information data and said associated azimuth and elevation angle values in said infrared target extractor in order to thereby prevent further transmission of at least one radar pulse towards the related false target.

8. The method as defined in claim 5, further including the step of:

feeding said genuine target information data and, as target coordinates, said associated azimuth and elevation angle and range values from said target correlator to a fire control system.

9. The method as defined in claim 1, further including the step of:

using said radar detection means for identifying stationary targets.

10. The method as defined in claim 1, further including the step of:

using said radar detection means for identifying moving targets and related velocity data.

11. An apparatus for area and air space surveillance, comprising:

passive infrared surveillance detection means operating in the infrared region and scanning a given scenario with respect to azimuth and elevation;

an infrared signal processor operatively associated with said passive infrared surveillance detection means and processing and storing incoming infrared-detected data;

said infrared signal processor filtering out, from said incoming infrared-detected data, infrared-detected potential target information data at associated azimuth and elevation angle values;

radar detection means;

said infrared signal processor being operatively connected with said radar detection means in order to activate said radar detection means for transmitting at least one short pulse to a potential target in accordance with at least said azimuth angle values associated with said infrared-detected potential target information data filtered out by means of said infrared signal processor;

said radar detection means producing radar-detected target information data associated with at least azimuth angle values;

correlating means correlating said radar-detected target information data at least at said associated azimuth angle values and said infrared-detected potential target information data associated with said azimuth and elevation angle values for discriminating between genuine target information data associated with azimuth and elevation angle values and false target information data associated with azimuth and elevation angle values; and said infrared signal processor storing said false target information data and said associated azimuth and elevation angle values for further comparison with infrared-detected potential target information data.

12. The apparatus as defined in claim 11 wherein:

said correlating means comprise a target correlator operatively associated with said infrared signal processor and said radar detection means.

13. The apparatus as defined in claim 12, wherein:

said radar detection means contain a radar data extractor and a radar data processor series connected with said radar data extractor;

said radar detection means receiving radar-detected data and said radar data extractor and said radar data processor processing said radar-detected data in order to thereby produce radar detected-target information data associated with at least said azimuth angle values; and said radar data extractor being connected to said target correlator and feeding said radar-detected target information data and at least said associated azimuth angle value to said target correlator.

14. The apparatus as defined in claim 13, wherein:

said target extractor of said infrared data processor masks and stores said false-target information data and said associated azimuth and elevation angle values in order to thereby prevent a further activation of said radar detection means in response to infrared-detected target information data originating from a false target.

15. The apparatus as defined in claim 13, wherein:

said radar data extractor additionally feeding at least range values conjointly with said radar-detected target information data and said associated azimuth angle values to said target correlator;

a fire control system operatively associated with said target correlator; and said fire control system receiving from said target correlator said genuine target information data and, as genuine target coordinates, said associated azimuth and elevation angle and range values.

16. The apparatus as defined in claim 11, further including:

a fire control system operatively associated with the surveillance apparatus; and orienting means acting upon said fire control system in order to orient said fire control system towards a genuine target identified by said genuine target information data and said associated azimuth and elevation angle values determined by said correlating means.

17. The apparatus as defined in claim 11, further including:

drive means for rotation of said passive infrared surveillance detection means in azimuthal direction;

drive means for rotating said radar detection means in azimuthal direction;

said drive means rotating said passive infrared surveillance detection means in said azimuthal direction at a slower rate than said radar detection means are rotated by the related drive means;

said passive infrared surveillance detection means containing a mirror pivotably supported in said passive infrared surveillance detection means; and control means controlling a predetermined pivoting movement of said mirror and said drive means for rotating said passive infrared surveillance detection means such that said passive infrared surveillance detection means perform a helicoidal spatial search movement.

18. The apparatus as defined in claim 11, wherein:

said passive infrared surveillance detection means containing a mirror and a detector operatively associated with said mirror and receiving video signals constituting said infrared-detected data;

an infrared data processor series connected with said detector; and said infrared data processor containing a preamplifier component receiving said video signals from said detector, an at least single-stage multiplexer following said preamplifier component, and an analog-to-digital converter unit series connected with said at least single-stage multiplexer and generating a serial data flow from data received from said at least single-stage multiplexer.

19. The apparatus as defined in claim 18, further including:

a target extractor operatively associated with said infrared signal processor;

said target extractor receiving said infrared detected potential target information data from said infrared signal processor; and said target extractor discriminating said infrared-detected potential target information data at said associated azimuth and elevation angle values against background and storing such infrared-detected potential target information data and their associated azimuth and elevation angle values.

20. The apparatus as defined in claim 19, wherein:

said infrared signal processor contains an at least one-dimensional prefilter unit;

said at least one-dimensional prefilter unit separating low-frequency signal components from said incoming infrared-detected data;

said target extractor following said at least one-dimensional prefilter unit and extracting said infrared-detected potential target information data at said associated azimuth and elevation angle values; and said target extractor delivering said infrared-detected potential target information data and said associated azimuth and elevation angle values to said target correlator.

21. The apparatus as defined in claim 20, further including:

a radar activation and control unit operatively associated with said radar detection means; and said radar activation and control unit being operatively connected with said target extractor of said infrared signal processor and receiving therefrom at least said azimuth angle values associated with said infrared-detected potential target information data.

22. The apparatus as defined in claim 11, wherein:

said radar detection means additionally producing elevation angle values associated with said radar-detected target information data; and said correlating means correlating said radar-detected target information data and said infrared-detected target information data also with respect to said associated elevation angle values.

* * * * *